Jan. 1, 1935.   L. BUEHLER, JR   1,986,249
REFRIGERATING MACHINE WITH AUTOMATIC FLOAT AND TEMPERATURE CONTROL
Filed Nov. 19, 1931
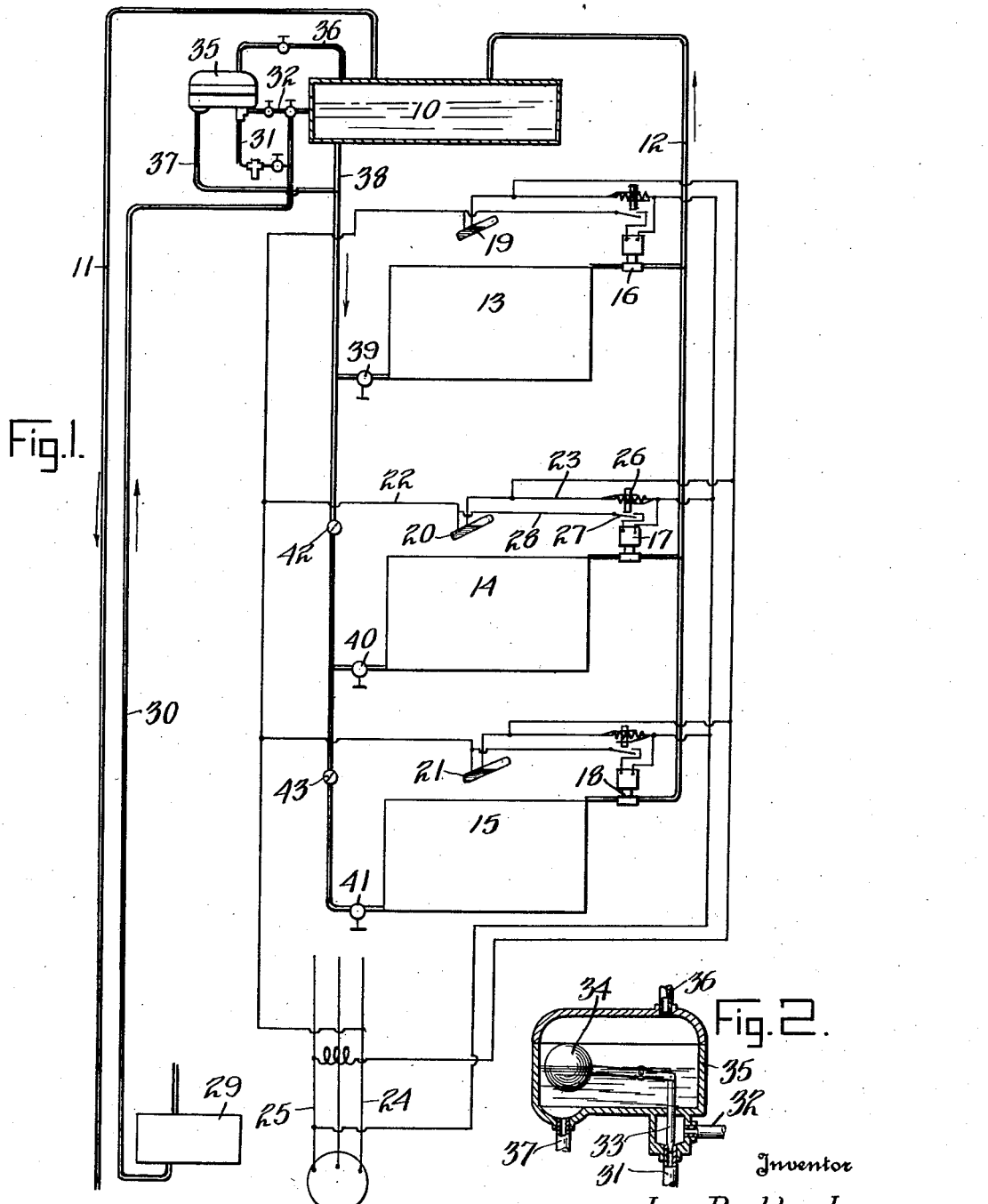
Inventor
Leon Buehler, Jr.

Patented Jan. 1, 1935

1,986,249

UNITED STATES PATENT OFFICE 1,986,249

REFRIGERATING MACHINE WITH AUTOMATIC FLOAT AND TEMPERATURE CONTROL

Leon Buehler, Jr., Waynesboro, Pa., assignor to Frick Company, Waynesboro, Pa., a corporation of Pennsylvania Application November 19, 1931, Serial No. 576,171

2 Claims. (Cl. 62—2)

This invention relates to refrigerating machines of the kind in which the flow of liquid refrigerant to the evaporators is controlled in response to liquid level of refrigerant in a suction trap or liquid tank and further in which the flow of refrigerant to the evaporators is controlled by the temperature in the evaporator or the evaporator chamber. More specifically the invention relates in general to the type of refrigerating machines shown in my Patent No. 1,937,809.

An object of the invention is to provide improvements in general in evaporators and refrigerating systems of the flooded type.

Referring to the accompanying drawing, which is made a part hereof and on which similar reference characters indicate similar parts, Figure 1 shows in elevation a refrigerating system having a plurality of evaporators and showing diagrammatically the fluid lines and controlled circuits for the system, and Figure 2, a detail view in section of the float chamber.

In the drawing numeral 10 indicates a liquid trap to which is connected a line 11 leading to the suction side of compressors not shown. The trap is connected through line 12 with the suction side of coils in evaporators 13, 14 and 15 which may be placed at different elevations as for example in the cooling rooms on each of the three floors of a building or storage house. The pipe 12 is connected with each of the evaporators through valves 16, 17 and 18. These valves are controlled by thermostats 19, 20 and 21 respectively so that when the temperature in the room falls to a predetermined low level the valves are closed. The valves may be operated in any suitable way as for example by solenoids or some other type of motor. As shown they are operated by solenoids, the circuit to which is closed by the thermostats when the temperature rises above a predetermined degree. Any suitable relay mechanism may be provided and, as shown, for example, the thermostat 20 is in circuit through wires 22 and 23 with power line wires 24 and 25, respectively. The wire 23 has a solenoid or electro-magnet coil 26 by means of which a switch 27 is closed, to close circuit directly from wire 22 to wire 28 to energize the solenoid 17. Liquid from a receiver 29 is delivered through pipe 30, pipe 31 to the trap 10. Flow of refrigerant from the pipe 31 to pipe 32 and thence into trap 10 is controlled by means of a valve 33 operated by a float 34. The top of the float chamber 35 is connected by means of pipe 36 with the top of the trap 10 and a pipe 37 connects the bottom of the float with a pipe 38 leading from the trap 10 to each of the several evaporators. The flow of refrigerant from the pipe 38 to each of the evaporators is controlled by valves 39, 40 and 41. Preferably check valves 42 and 43 are provided in advance of valves 40 and 41 to prevent the return of refrigerant or pressure back through the liquid line 38.

In operation liquid refrigerant flows from the line 30 through lines 31 and 32 into the trap 10 from which it flows through the line 38 to each of the evaporators. By means of line 37 and pipe 36 liquid in float chamber 35 is at the same level as liquid in the trap 10. Any lowering of the liquid in the trap 10 therefore will affect the float 34 to open the valve 33 and permit liquid to flow through the line 30 into the trap. Suction from the evaporators is drawn through lines 12 and 11 into the suction of a compressor or compressors. By means of the thermostats 19, 20 and 21, the suction valves 16, 17 and 18 are controlled so that when the temperature in the respective chamber drops to a predetermined low level the suction valve is closed so that the temperature no longer is reduced in that chamber. When the temperature rises again in the chamber, the valve is opened and the suction is again effective in the respective evaporator coils.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A refrigerating system having a plurality of evaporators, a suction trap, a float chamber, means for maintaining the liquid at the same level in the float chamber as in the suction trap, and a valve outside of the float chamber and controlled by the level of the liquid in the float chamber for controlling the level of refrigerant in the suction trap, each of the evaporators having electrically operated outlet valves which are controlled in response to changes in the temperature of the chamber in which the evaporator is located, substantially as set forth.

2. A refrigerating system having a plurality of evaporators, a liquid trap, means for automatically adjusting the liquid refrigerant feed to maintain a substantially constant level in the liquid trap, and thermostatically electrically operated shut-off valves controlling one or more of the evaporators.

LEON BUEHLER, JR.